United States Patent
Bose et al.

(10) Patent No.: US 7,134,028 B2
(45) Date of Patent: Nov. 7, 2006

(54) PROCESSOR WITH LOW OVERHEAD PREDICTIVE SUPPLY VOLTAGE GATING FOR LEAKAGE POWER REDUCTION

(75) Inventors: Pradip Bose, Yorktown Heights, NY (US); David M. Brooks, Newark, DE (US); Peter W. Cook, Mount Kisco, NY (US); Philip G. Emma, Danbury, CT (US); Michael K. Gschwind, Chappaqua, NY (US); Stanley E. Schuster, Granite Springs, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 10/428,170

(22) Filed: May 1, 2003

(65) Prior Publication Data

US 2004/0221185 A1 Nov. 4, 2004

(51) Int. Cl.
*G06F 1/26* (2006.01)
*G06F 1/32* (2006.01)
(52) U.S. Cl. ..................... 713/300; 713/320
(58) Field of Classification Search ............... 713/300, 713/323, 324, 320
See application file for complete search history.

(56) References Cited

U.S. PATENT DOCUMENTS

| | | | | |
|---|---|---|---|---|
| 5,392,437 A | * | 2/1995 | Matter et al. | 713/324 |
| 5,452,401 A | * | 9/1995 | Lin | 713/322 |
| 5,666,537 A | * | 9/1997 | Debnath et al. | 713/322 |
| 5,740,417 A | * | 4/1998 | Kennedy et al. | 712/239 |
| 5,781,783 A | * | 7/1998 | Gunther et al. | 713/320 |
| 5,996,083 A | * | 11/1999 | Gupta et al. | 713/322 |
| 6,247,134 B1 | | 6/2001 | Sproch et al. | |
| 6,545,515 B1 | * | 4/2003 | Takahashi et al. | 327/110 |
| 6,625,740 B1 | * | 9/2003 | Datar et al. | 713/324 |
| 6,671,815 B1 | * | 12/2003 | Iwamura et al. | 713/324 |
| 6,934,865 B1 | * | 8/2005 | Moritz et al. | 713/324 |

OTHER PUBLICATIONS

Zhenyu Tang, Norman Chang, Shen Lin, Weize Xie, Sam Nakagawa, Lei He, "Ramp Up/Down Functional Unit to Reduce Step Power", Power-Aware Computer Systems, First International Workshop, PACS 2000, Cambridge, MA, Nov. 12, 2000.*

Borkar, S., "Design Challenges of Technology Scaling," *IEEE Micro*, vol. 19, No. 4, Jul./Aug. 1999, pp. 23-29.

Gowan, M., Biro, L. and Jackson, D. "Power Considerations in the Design of the Alpha 21264 Microprocessor" *Proc. ACM/IEEE Design Automation Conference* (Jun. 1998), pp. 726-731.

(Continued)

*Primary Examiner*—Thomas Lee
*Assistant Examiner*—Ji H. Bae
(74) *Attorney, Agent, or Firm*—Law Office of Charles W. Peterson, Jr.; Louis J. Percello, Esq.; Satheesh K. Karra, Esq.

(57) ABSTRACT

An integrated circuit (IC) including unit power control, leakage reduction circuit for controllably reducing leakage power with reduced LdI/dt noise in the IC and, an activity prediction unit invoking active/dormant states in IC units. The prediction unit determines turn on and turn off times for each IC unit. The prediction unit controls a supply voltage select circuit selectively passing a supply voltage to a separate supply line at the predicted turn on time and selectively blocking the supply voltage at the predicted turn off time.

26 Claims, 8 Drawing Sheets

OTHER PUBLICATIONS

Gunther, S. H., Binns, F., Carmean, D., M., Hall, J. C., "Managing the impact of increasing microprocessor power consumption," *Intel Technology Journal*, 1st. Quarter 2001.

Ohnishi, M., Yamada, A., Noda, H. and Kambe, T., "A Method Of Redundant Clocking Detection And Power Reduction At The RT Level Design," *Proc. Int'l Symp. On Low Power Electronics and Design (ISLPED)*, 1997, pp. 131-136.

Sanchez, H., "Thermal management system for high performance PowerPC microprocessors," *Digest of Technical Papers, IEEE COMPCON*, 1997.

Wei, L., Roy, K., De, V., "Low Voltage Low Power CMOS Design Techniques for Deep Submicrons IC's," *Proc. of IEEE Int'l Conf. On VLSI Design*, Jan. 2000, pp. 24-29.

* cited by examiner

PROCESSOR WITH LOW OVERHEAD PREDICTIVE SUPPLY VOLTAGE GATING FOR LEAKAGE POWER REDUCTION

BACKGROUND OF THE INVENTION

1. Field of the Invention

The present invention generally relates to the reduction and control of power consumption in a microprocessor or system comprised of a plurality of clocked components or units.

2. Description of the Related Art

Semiconductor technology and chip manufacturing advances have resulted in a steady increase of on-chip clock frequencies, the number of transistors on a single chip, the chip die size itself and, a corresponding decrease in chip supply voltage ($V_{dd}$). Generally, the active power consumed by a given clocked unit is primarily from switching chip capacitive loads and increases linearly with the clock frequency. Thus, not withstanding the decrease of chip supply voltage, active chip power consumption has increased as well.

Moreover, independent of operating frequency, chip leakage or standby power increases linearly with the number of chip transistors. Especially for chips and circuits in the insulated gate field effect transistor (FET) technology commonly referred to as CMOS, a substantial portion of chip leakage is subthreshold leakage. Subthreshold leakage is current in a that flows (drain to source) through the FET channel even when the FET gate to source voltage is insufficient to turn on the FET, i.e., below threshold voltage ($V_t$) of the FET. S. Borkar, "Design Challenges of Technology Scaling," *IEEE Micro*, vol. 19, no. 4, July/August 1999, pp. 23–29, describes how subthreshold leakage power is increasing as a percentage of total power dissipation. This percentage increase is occurring because as $V_{dd}$ is falling, $V_t$ must remain more or less constant. Thus, even if chip active power is reduced to zero, i.e., effectively the chip is shut down, subthreshold leakage continues to consume power.

Consequently, both at the chip and system levels cooling and packaging costs have escalated as a natural result of these chip power increases. For low end systems (e.g., handhelds, portable and mobile systems), where battery life is crucial, reducing net power consumption is important; but, it must come without degrading performance to unacceptable levels. Thus, particularly with state of the art central processing units (CPUs), even with the advances in CPU architecture, whether a scalar, superscalar, vector, or some other type of processor, this increase in microprocessor power dissipation has become a major stumbling block for performance gains.

A scalar processor fetches and issues/executes one instruction at a time. Each such instruction operates on scalar data operands. Each such operand is a single or atomic data value or number. Pipelining within a scalar processor introduces what is known as concurrency, i.e., processing multiple instructions in a given clock cycle, while preserving the single-issue paradigm.

A superscalar processor can fetch, issue and execute multiple instructions in a given machine cycle. In addition, each instruction fetch, issue and execute path is usually pipelined to enable further concurrency. Examples of super scalar processors include the Power/PowerPC processors from IBM Corporation, the Pentium Pro (P6) processor family from Intel Corporation, the Ultrasparc processors from Sun Microsystems and the PA-RISC and Alpha processor families from Hewlett Packard (HIP) Company.

A vector processor typically is pipelined and can perform one operation on an entire array of numbers in a single architectural step or instruction. For example, a single instruction can add each entry of array A to the corresponding entry of array B and store the result in the corresponding entry of array C. Vector instructions are usually supported as an extension of a base scalar instruction set. Only those code sections that can be vectorized within a larger application are executed on the vector engine. The vector engine can be a single, pipelined execution unit; or, it can be organized as an array or single instruction multiple data (SIMD) machine, with multiple, identical execution units concurrently executing the same instruction on different data. For example, typically, Cray supercomputers are vector processors.

A synchronously clocked processor or system has a single, global master clock driving all the units or components comprising the system. Occasionally, by providing ratioed derivatives of the clock may cycle, e.g., clock doubling, a particular sub-unit faster or slower than the main or master clock frequency. Normally by design, such clocking decisions are predetermined and preset statically. For example, the Intel Pentium 4 processor clocks its integer pipe twice as fast as the chip master clock, ostensibly using what is known in the art as double-pumping or wave-pipelining. Such clock doubling techniques boost processor execution rates and performance. However, bus and off-chip memory speeds have not kept pace with processor computing logic core. So, most state of the art processors have off-chip buses and caches that operate at frequencies that are integral sub-multiples of the main processor clock frequency.

Usually, these clock operating frequencies are fixed during system design. This is the reason current generation processor complexes may have multiple clocking rates. Occasionally, double pumping and wave-pipelining are used in higher end machines to alleviate any performance mismatch between the processor and external buses or memories.

Typically, clock gating is used to reduce active power. A. Chandrakasan and R. Brodersen, ed., "Low-Power CMOS Design," IEEE Press, 1998, describes power reduction using synchronous clock-gating wherein the clock may be disabled at a point of regeneration, i.e., within a local clock buffer (LCB) feeding a particular chip region, component or latch. At a coarser level of control, clocks are gated along functional boundaries. At a finer level of control, clocks are gated at individual latches. For example, H. Sanchez, "Thermal management system for high performance PowerPC microprocessors," *Digest of Technical Papers, IEEE COMPCON*, 1997, teaches gating clocks to different execution units based on instructions dispatched and executed in each cycle.

Coarse idle control can be synthesized during code generation by the compiler inserting special instructions, included in the instruction set architecture; alternately, these instructions can be issued dynamically by the operating system, e.g., when servicing a special interrupt or at certain context-switch times. At the coarsest control level, a special sleep-type instruction or command can be issued; this special sleep command can generate a disable signal that stops the clock to a selected portion of the chip for a period of time. This same special sleep command can be used to disable the instruction fetch process. Likewise an implicit wake up begins when the disable signal is negated or after the sleep period; or, the wake up can be accomplished with an explicit, asynchronous interrupt. As is well known in the art, various power-down modes can be provided (e.g. nap, doze or sleep) with the clock distribution tree selectively disabled at various levels of the LCB hierarchy. At the next finer level of granularity, the compiler can insert special instructions to start gating off the clock(s) to a given unit, e.g. the floating point unit, whenever the compiler can statically predict the computation phases.

A hardware idle self-detect mechanism may be included. The idle self-detect logic can be designed to detect localized processor idle periods. Upon detection the local unit triggers clock-disabling and/or local supply voltage reduction ($V_{dd}$ and/or ground) for some or all of the idling unit region(s). Each unit disables its own clock and/or local supply voltages for a period of time. A wake-up is similarly self-initiated, based on new work received by the disabled or sleeping unit.

For finer idle control, dynamically defined signals gate local clocks (but, previously not supply voltages) cycle-by-cycle. For a typical superscalar machine for example, the processor determines during instruction decode which functional unit pipes could be clock-gated during the subsequent execute cycles. This works well in a processor with "in-order" issue mechanisms, so that the gating decision can be made unambiguously and sufficiently ahead of time, i.e., at decode or dispatch time. If the instruction class information is preserved in a centralized issue queue on an entry-by-entry basis, then such gating signals can also be generated at issue time even for an out-of-order issue queue.

In any pipelined data path, redundant clocking can be detected dynamically and selectively prevented, e.g., propagating a Data Valid flag or bit along the logic pipeline; this Data Valid flag is set only when the data generated on a cycle is valid. Then, the Data Valid flag for each logic stage can be used as a clock enable for setting the stage's output latches. Thus, invalid data is not unnecessarily clocked through the succeeding pipeline stages in what may be referred to as fine-grain, valid-bit based, pipeline stage-level clock gating.

U.S. Pat. No. 6,247,134 B1 to Sproch et al., entitled "Method and System for Pipe Stage Gating Within an Operating Pipelined Circuit for Power Savings" Jun. 12, 2001 teaches a processor with logic to identify as inconsequential any newly received operand that would not change in the pipeline in a prior cycle's computation by the first stage of logic. Detection of such an invariance condition signal as inconsequential can be used to disable the clock to the first stage and, then, successively to following stages.

Ohnishi, M., Yamada, A., Noda, H. and Kambe, T. "A Method of Redundant Clocking Detection and Power Reduction at the Rt Level Design," *Proc. Int'l. Symp. On Low Power Electronics and Design* (ISLPED), 1997, pp. 131–136, discuss other, more elaborate idle detection mechanism to prevent various kinds of redundant latch clocking.

Coarse-grain unit-level clock-gating is beneficial in cases when the processor is executing a sequence of a certain functional class of instructions, e.g., integer-only or floating-point-only instructions. When the input workload is such that the processor sees integer code only, the clock regenerator(s) to the floating point unit may be disabled. Similarly, during the floating-point-only operation, clocks to the integer unit can be disabled. Coarse idle control is normally effected locally with software through serial instructions or using hardware to detect idle periods. Fine idle control, normally, is effected also locally during instruction decode by avoiding unnecessarily propagating invalid or inconsequential data.

There are at least two problems arising from coarse idle control that must be addressed. These are especially a concern when supply voltage gating is employed. First, large transient current drops and gains can cause unacceptable levels of inductive (LdI/dt) noise in on-chip supply voltage. Second, overhead cycles are required for gating off and on processes to maintain correct functional operation. Switching between gated and enabled modes too frequently for finer grain phase changes in the workload results in an unacceptable performance hit.

Further, state of the art fine idle control relies on locally generated gating signals or conditions for pipeline stage-level clock-gating, e.g., based on a data-invalid or inconsequential-operand condition. These state of the art approaches do not generate the gating signal on a predictive or anticipatory basis. So, the timing requirements are often critical because the gating signal must be available in advance of assertion and asserted for a suitable duration for error-free clock-gating operation. Gowan, M. K., Biro, L. L. and Jackson, D. B., "Power considerations in the design of the Alpha 21264 microprocessor," *Proc.* 1998 *ACM/IEEE Design Automation Conference*, pp. 726–731, (June 1998) discuss how these constraints can significantly complicate design timing analysis, even resulting in a degraded clock-frequency performance. While in spite of these problems, clock-gating may reduce average active (or "switching") power in a processor, it still does not reduce static or standby power.

Instead, supply voltage gating (also called power or $V_{dd}$ gating) may be used for reducing static or leakage power. Even when a FET or CMOS circuit block inactive (off), current leakage from $V_{dd}$ to ground still occurs as subthreshold leakage. So, these CMOS circuits consume power even with clocks disabled or held constant, i.e., high or low. As noted above, this subthreshold leakage component of total power is rising due to technology scaling effects, reducing the gap between $V_{dd}$ and the device threshold voltage, $V_t$. Supply voltage gating gates $V_{dd}$ or ground (GND) to the FET/circuit, eliminating the current flow path. So, an additional "header" or "footer" FET or device is in the path circuit current flow path from $V_{dd}$ to ground. The header/footer device is on during normal activity, i.e., when the circuit is gated active. When gated off or idle, the header/footer device is turned off to electrically isolate the complementary FET pair from either supply rail, i.e., the $V_{dd}$ rail or the GND rail. L. Wei, K. Roy, V. De, "Low Voltage Low Power CMOS Design Techniques for Deep Submicron IC's," *Proc. of IEEE In'i. Conf. On VLSI Design*, January 2000, pp. 24–29, describes a straightforward application of $V_{dd}$ gating.

However, application of the Roy method may result in a large performance degradation with unreliable circuit operation from large (uncontrolled) surges in the power supply lines and, potentially, an increase in total average power. There are two reason for the performance degradation. First, adding the supply gating control circuitry increases the basic delay of the gated circuit block because it adds impedance in the circuit's supply path. If the performance overhead is reduced by allowing sharp turn-ons and turn-offs, then LdI/dt noise may be considerable. In any case, supply voltage gating adds some performance overhead, which is the second source of performance degradation. Gating circuits on and off with a graceful ramp-up/down to minimize LdI/dt can incur a delay up to as much as several hundred processor cycles in resuming/stopping normal operation. As a result, total average power consumption can actually increase from being gated on and off too frequently. In particular, even if the average utilization is low, average power consumption can increase if the added switching or active power of the gating control device and related circuitry is more than the leakage power saved.

Current gating methods and especially, supply gating methods, whether coarse—or fine-grain, are termed non-predictive. The typical voltage gating signal is generated locally based on events and logical conditions that are tracked within a temporal window of a few cycles.

Thus, there exists a need for gated power supply designs that are able to hide the currently large performance overheads, especially is in processor designs, without impaired circuit reliability such as from increased inductive noise on the supply voltage rails.

SUMMARY OF THE INVENTION

It is a purpose of the present invention to reduce processor power consumption, without appreciable performance loss;

It is another purpose of the invention to reduce processor leakage power.

The present invention is related to an integrated circuit (IC) including unit power control, leakage reduction circuit for controllably reducing leakage power with reduced LdI/dt noise in the IC and, an activity prediction unit invoking active/dormant states in IC units. The prediction unit determines turn on and turn off times for each IC unit. The prediction unit controls a supply voltage select circuit selectively passing a supply voltage to a separate supply line at the predicted turn on time and selectively blocking the supply voltage at the predicted turn off time

BRIEF DESCRIPTION OF THE DRAWINGS

The foregoing and other objects, aspects and advantages will be better understood from the following detailed description of illustrative embodiments of the invention with reference to the drawings, in which.

DESCRIPTION OF PREFERRED EMBODIMENTS OF THE INVENTION

Figure 1:
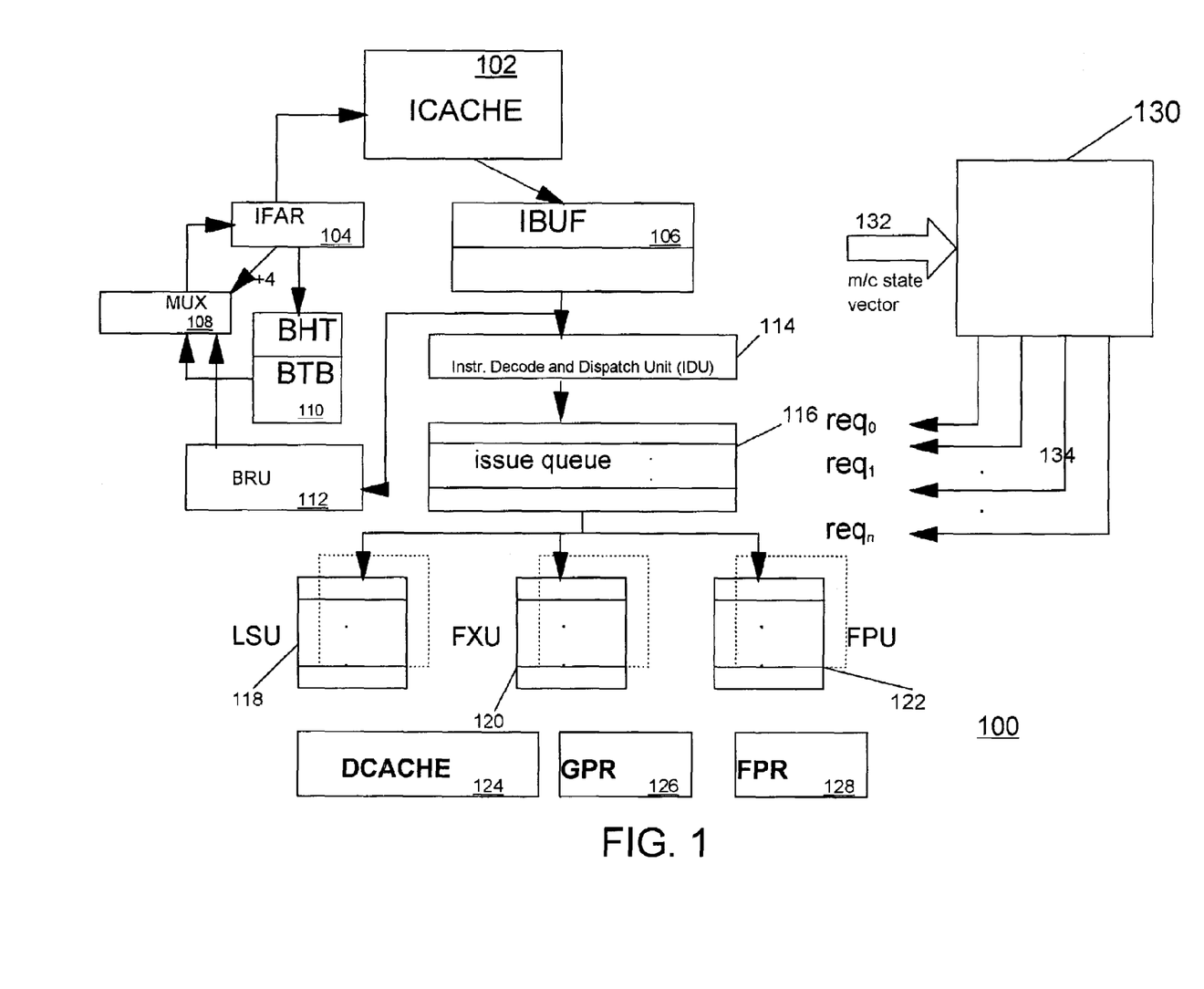
FIG. 1 shows a high level block diagram example of a preferred embodiment component with subthreshold leakage power consumption reduction and control according to the present invention.

Turning now to the drawings and, more particularly, FIG. 1 shows a high level block diagram example of a preferred embodiment component (a processor 100 in this example) with subthreshold leakage power consumption reduction and control according to the present invention. In particular, component circuits or units share a common supply or multiple supply voltage ($V_{dd}$) sources. Average component leakage power is reduced without appreciable performance degradation, e.g., as measured using instructions per cycle (IPC) and without requiring significant additional hardware. Further, reliable component operation is maintained with a tight control on inductive noise (LdI/dt) effects. Where maximum power dissipation (and hence temperature) limits are rigidly constrained, power consumption is controlled with a minimal performance loss over a small, predetermined time window to maintain the component at or return the component to normal operating conditions.

The present invention has application to any synchronously clocked processor, e.g., scalar, superscalar, vector or otherwise, where unit operation/inoperation is predictable well in advance of execution, in this example, the component is a multi-issue (dual-issue in this example) superscalar, pipelined processor 100. Further, the present invention has application to any degree of idle control, coarse or fine, although it has most efficient application when used in combination with fine idle control. An instruction cache (ICACHE) 102, an instruction fetch address register (IFAR) 104, an instruction buffer (IBUF) 106, multiplexor 108, branch history table and branch target buffer logic BHT/BTB 110, a branch unit 112, an instruction decode-dispatch unit IDU 114 and an issue queue 116 form a typical instruction unit (I-Unit). Load-store unit (LSU) 118, fixed point integer execution unit (FXU) 120, floating point execution unit (FPU) 122 in combination with a data cache (DCACHE) 124, general purpose (integer) data registers (GPR) 126 and floating point data registers (FPR) 128 form a typical execution unit (E-Unit). In addition, unit-level activity prediction logic 130 receives a current-cycle machine state vector 132 as input and provides request signal(s) 134 that "wake up" target units or initiate "sleep" or "power-down" to selectively shut down a target unit in anticipation of a (relatively) long idle stretch for that unit. Each and any of units 102, 104, 106, 108, 110, 112, 114, 116, 118, 120, 122, 124, 126 and/or 128 may be designated target units.

Specifically, the unit-level activity prediction logic 130 includes a history utilization table to track and identify/predict significant unit-level utilization changes (and attendant workload phases of significant duration) hundreds of cycles in advance of such events. Based on predicted unit level changes, unit-level activity prediction logic 130 ramps a supply enabling circuit ($V_{dd}$-enabling in this example) to gradually "wake up" an idle ("powered off") unit in anticipation of its usage. The ramped $V_{dd}$-enabling minimizes LdI/dt to ensure manageable inductive noise. Thus, since the previously idle unit is fully $V_{dd}$-enabled by the time it is actually needed, there is no loss of architectural performance, as measured in cycles per instruction (CPI). Similarly, on a prediction of a long idle period for a particular unit, that unit can be $V_{dd}$-gated, ramped off without incurring a performance degradation or unacceptably large voltage overshoot.

So, during each valid fetch cycle machine instructions are fetched from the ICACHE 102 based on an instruction fetch address from IFAR 104. Fetched instructions are placed in IBUF 106 from which subsequent instruction processing steps are initiated. At the beginning of each fetch cycle the instruction fetch address selected by MUX 108 is loaded into the IFAR 104. MUX 108 receives addresses from multiple sources. A next sequential address to MUX 108 may be an integer value obtained by adding 4 bytes to the current IFAR value. MUX 108 may receive a target address of a branch that is predicted by the BHT/BTB 110. The BRU 112 may produce an actual resolved branch address (that may override an earlier prediction by BHT/BTB 110), which is passed to the MUX 108. Branch instructions are scanned from the IBUF 106 and processed by the BRU 112 in parallel with the decode and dispatch process performed by IDU 114. After (non-branch) instructions have been decoded to classify the operation types, they are dispatched into issue queue 116, where they wait until they are selected for issue to one of the actual execution units, LSU 118, FXU 120 and FPU 122. The LSU 118, FXU 120 and FPU 122 have access data in DCACHE 124, GPR 126 and FPR 128, which may be used in processing the issued instructions. Optionally, for out-of-order issue, the issue queue 116 has logic that enables issuing instructions into the back-end execution pipes, i.e., in a sequence that is out-of-order with respect to the original program instruction sequence. Typical completion logic (not shown) may be included to ensure eventual in-order completion of instructions as far as user-visible architected machine state is concerned. Also, additional hardware may be included to support other typical features if included, e.g., register renaming to further accelerate performance in such super scalar machines requires hardware to buffer and control renamed data values.

In addition as described hereinbelow, the unit-level activity prediction logic 130 selectively enables and disables supply voltage, $V_{dd}$, to sub-units of the processor 100 during a given workload execution in a timely manner. The current-cycle machine state vectors at input 132 are used by the unit-level activity prediction logic 130 to generate "wake up" and "sleep" or "power-down" request signal(s) 134 to target units, initiating active and dormant states, respectively, and in a timely manner.

In particular, timely generation of predictive "wake-up" request signal(s) ensures that each target unit is in its active (powered on) state sufficiently before the sourcing units actually provide machine instructions to the target unit for processing. Similarly, when a (relatively) long stretch of idleness is identified for a unit, a "power off" or "sleep" request is issued to shut down that unit, placing it in a dormant state. The preferred predictive logic has a built-in, history-based adaptive (or "learning") mechanism. This learning mechanism increases the likelihood over the application's run, that each such leakage-managed unit eventually adapts to a point where it is turned on "just-in-time," but no sooner; similarly, each such unit turns off very shortly after the last "active stretch" is encountered. Optimally, leakage power is reduced by ensuring that each unit powers-up only on-demand, without any startup performance overhead loss. Furthermore, as described below, the optimal proactive power-up process for each unit minimizes the average (extra) power consumed and inductive or current surge (LdI/dt) power on noise. For occasionally rare power-up requests that are not sufficiently anticipated, a startup performance penalty is accepted, while still ensuring safe (reliable) operation via controlled current surge and "turn-on" power dissipation.

Figure 2:
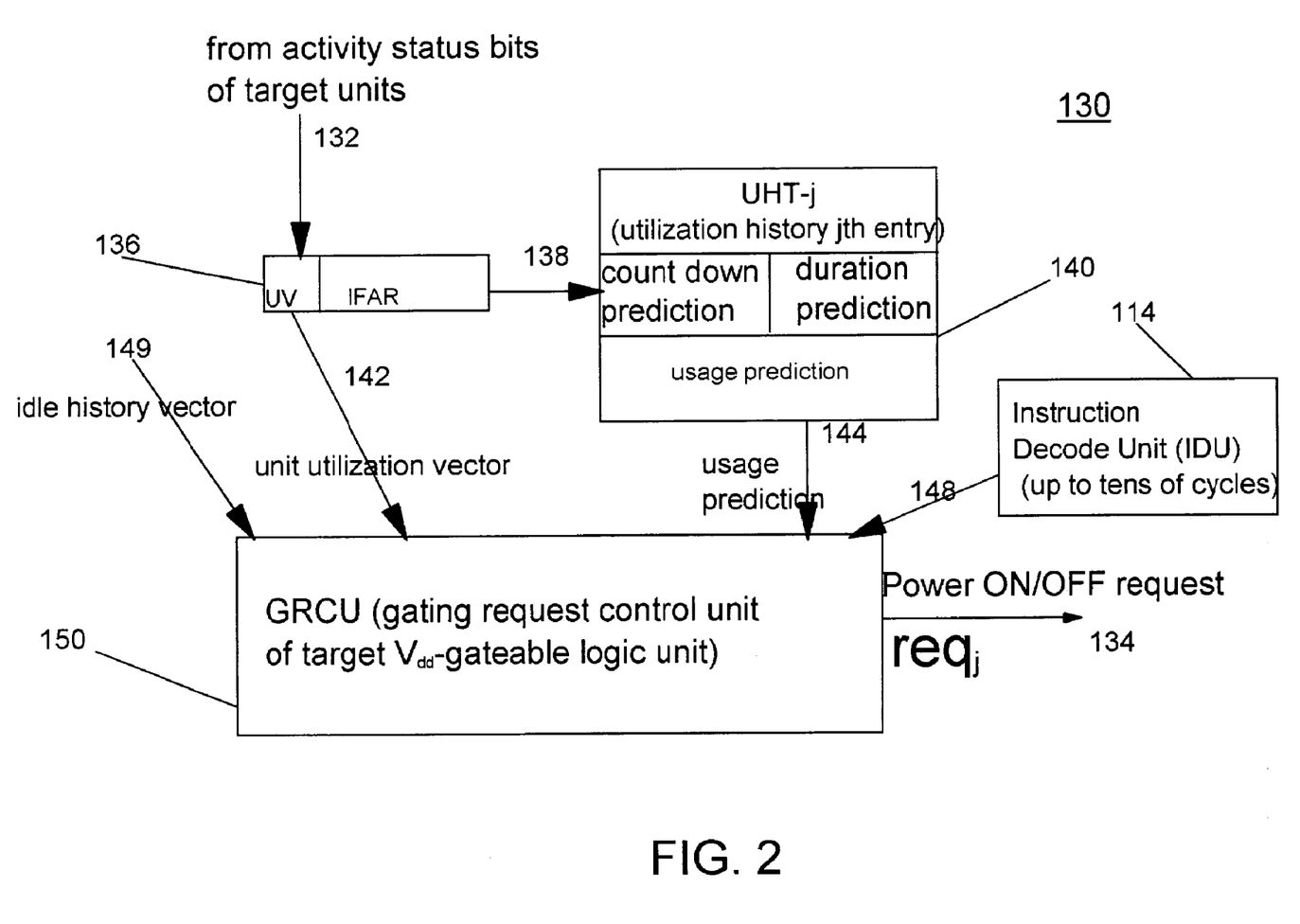
FIG. 2 is a block diagram example of a preferred unit-level activity prediction logic.

FIG. 2 is a block diagram of a preferred unit-level activity prediction logic 130, which is proactive, predictively requesting transition to active/dormant unit states. Current-cycle machine activity state vectors are provided at input 132 to an unit utilization vector (UV) field that is concatenated with the instruction fetch address register (IFAR) field within a combined UV/IFAR register 136. UV/IFAR 136 provides a table index 138 to prediction table unit, referred to as utilization history table UHT in prediction unit 140 and a unit utilization vector output 142. The UHT in prediction unit 140 provides for Long range prediction 144, i.e., hundreds of processor cycles. Lockup entries in the UHT, UHT-1 through UHT-n, identify a predictively controlled, supply gated target unit, where n is the number of controlled target units. In this example, only the jth entry field, UHT-j is shown for brevity. The IDU 114 provides short-range (up to tens of cycles) advance prediction as immediate power-up request vectors 148 to a gating request control unit (GRCU) 150. Each immediate power up vector 148 is a m-bit binary string that identifies which of the m downstream receiving execution units to turn on within the next few cycles, where m is generally less than or equal to the total number, n of supply gabble units. The GRCU 150 also receives the usage prediction 144, i.e., CDP and ADP values for all n gatable units, from the UHT and the UV field entry 142 from the UV/IFAR register 136. GRCU 150 generates a "wake-up" (or power-up) and "sleep" (or power-down), active/dormant request signals 134 for target units. In addition to the long- and short-term usage prediction/usage signals 144 and 148 (respectively), in general, the GRCU also receives an idle history vector, IHV 149, from the target (gabble) units. The IHV 149 is a n-bit binary string that indicates which units have been idle for a predetermined "long" period (e.g. 100,000 cycles) and are therefore candidates for possible power-down.

For a given design, chip or processor, n may be 1 to manage leakage power in a single, particularly high-powered unit, e.g., a floating point unit. Generally, each such entry includes fields that contain values in two binary sub-fields: a countdown prediction (CDP) sub-field that is p bits and at least one bit; and, an active duration prediction (ADP) sub-field that is q bits and also at least one bit. Initially, each unit can be predisposed to turn on as soon as possible to avoid a performance penalty from a stall while powering up. In this conservative approach, the CDP field for each entry UHT-j (for the first lookup using a given UV/IFAR index) is set to zero with all p bits 0, for example. Similarly initially, the unit can be predisposed to be in use for a very long period after it is turned on by setting the ADP field to the maximum value with all q bits set to 1. Alternatively, the CDP and ADP fields can be initialized (or occasionally set) explicitly through architecture/compiler support, based on usage prediction. This explicit initialization prediction can be done using well known static program analysis or profile-driven analysis methods. For the minimum (lowest cost) encoding example with both p and q being 1 bit: one CDP state (e.g., 0) indicates immediate (ASAP) turn-on request and, the other CDP state (1) indicates deferred turn-on request, e.g., 100 or 500 cycles, etc., from current epoch; similarly, one ADP state (e.g., 0) indicates an expected minimum active period (e.g., 10 cycles), while the other ADP active state (1) indicates an expected maximum active period (e.g., 100,000 cycles or more), where the implied value (100,000) may be understood to be variable, depending on the gatable unit targeted. For larger ADP and CDP fields, different p and q bit encodings imply periods selected by design. Preferably, the UV/IFAR register, contains a significantly reduced (hashed) vector, instead of the maximum size possible: which is n+w bits, where n is the number of target supply gatable units and w is the instruction address (program counter). Any suitable well known hashing algorithm may be used, depending upon the cost-power-performance tradeoff point chosen in a given design. Further, the number of hashed bits in the UV/IFAR lookup index is the base 2 log of the number of distinct index entries into the UHT.

The GRCU 150 uses the UV 142 input to determine which units are already active (powered on) or dormant (powered off). Thus, depending on the power-on requests received from the long-range usage prediction 144 (from the UHT 140) and the short-range usage request 148 from the IDU 114, the GRCU 150 initiates timely and non-redundant communication of decisive "turn-on" or "turnoff" requests to target gatable units.

Figure 3A:
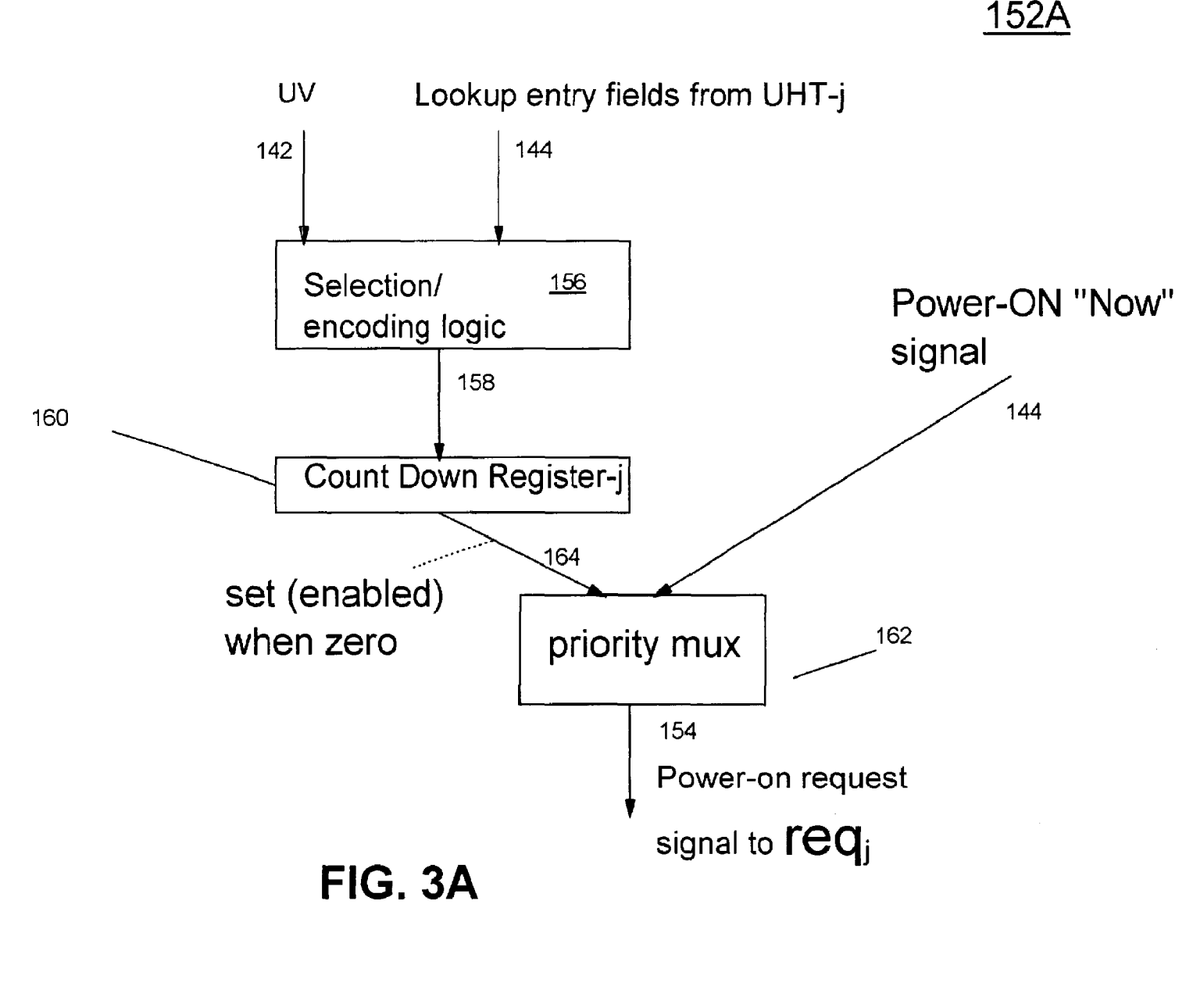
FIGS. 3A–B show a block diagram example of power up/down request logic for generation of individual request signals req$_j$.

FIG. 3A shows a block diagram example of power up request logic 152 in GRCU 150 for generation of one of a number of power on request signals 154 which generate GRCU outputs $req_j$ 134 in FIG. 2. Selection/encoding logic 156 combines utilization vectors 142 from UV/IFAR 136 and usage prediction 144 passes a count 158 to Count Down Register 160. A priority multiplexor 162 receives an anticipated active/dormant signal 164 from count down register 160 and immediate active signal 148 from IDU 114. Priority multiplexor 162 drives a power on request signal 154 to a corresponding $req_j$ 134.

Figure 3B:
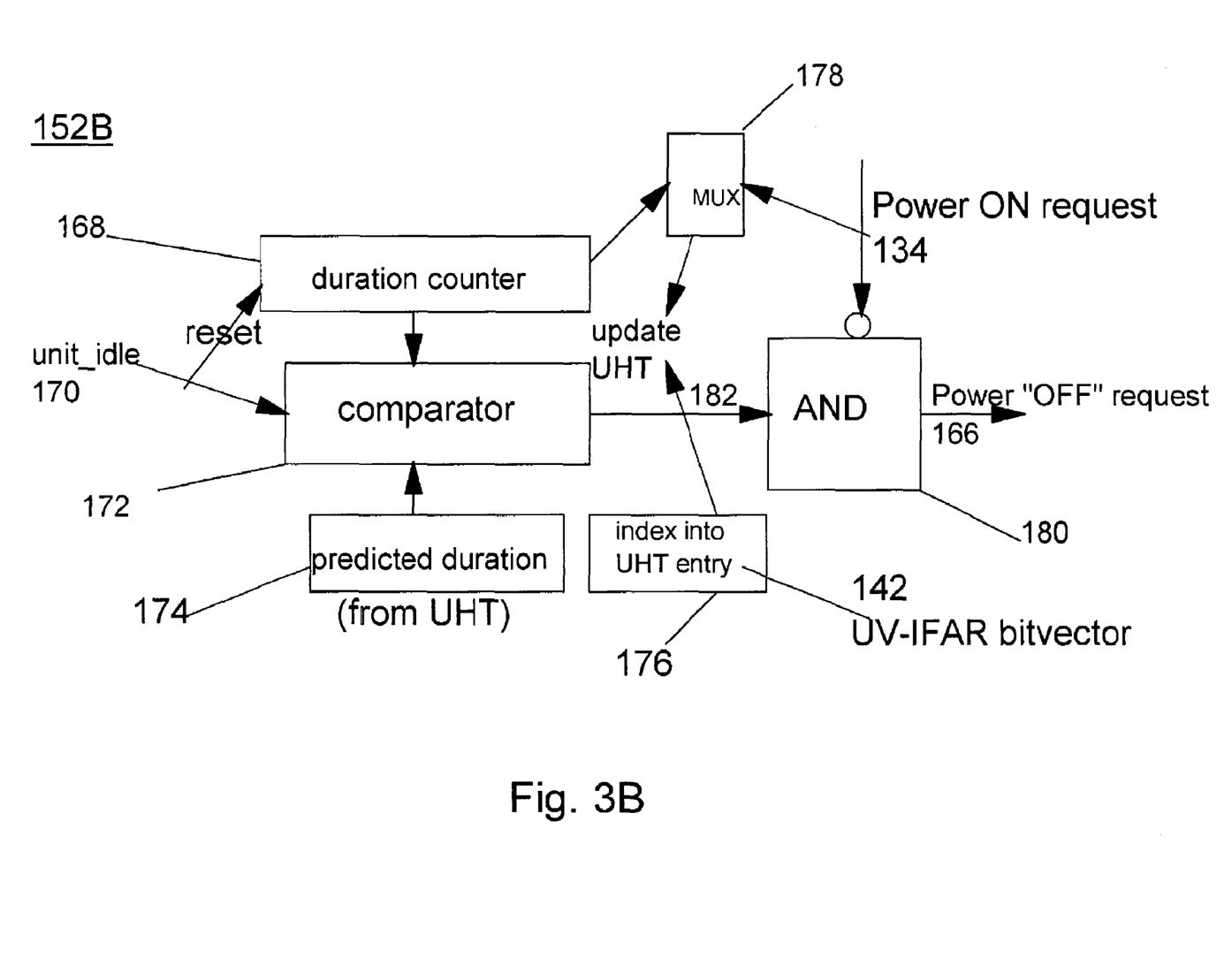

FIG. 3B shows a block diagram example of power down request logic 152B in GRCU 150 for generation of one of a number of power off request signals 166 which generate GRCU outputs $req_j$ 134. A duration counter 168 is reset 170 at the beginning of each active period and maintains a count indicating the duration of the current active period. A comparator 172 compares the current duration count with the predicted count duration 174 from the usage history table. The utilization vector (bitvector 142) provides an index 176 into the utilization history table in prediction unit 140 in FIG. 2. A multiplexor 178 selectively passes the current duration count to update the utilization history table in prediction unit 140, e.g., when the actual count duration is longer than what was predicted. AND gate 180 passes the comparator result 182 as power off request signals 166 when a power up 134 has not been asserted. The power on request signals 134 and power off request signals 166 may be combined to generate GRCU outputs $req_j$ 134 using, for example, a set reset/latch (not shown).

Optionally, each gatable unit can generate an alternate, power-off self request based on a simple count of successive idle cycles. So, if such an unit is idle for a predetermined number of cycles, the unit anticipates the onset of a long idle period and asserts its corresponding bit in the IHV string (149 in FIG. 2). In this optional embodiment, the GRCU power-off request generation logic is augmented to factor in the IHV input and, for example, signals an power-down request override that may be available sooner than predicted and, therefore, further reducing leakage power dissipation in target gatable units.

Figure 4:
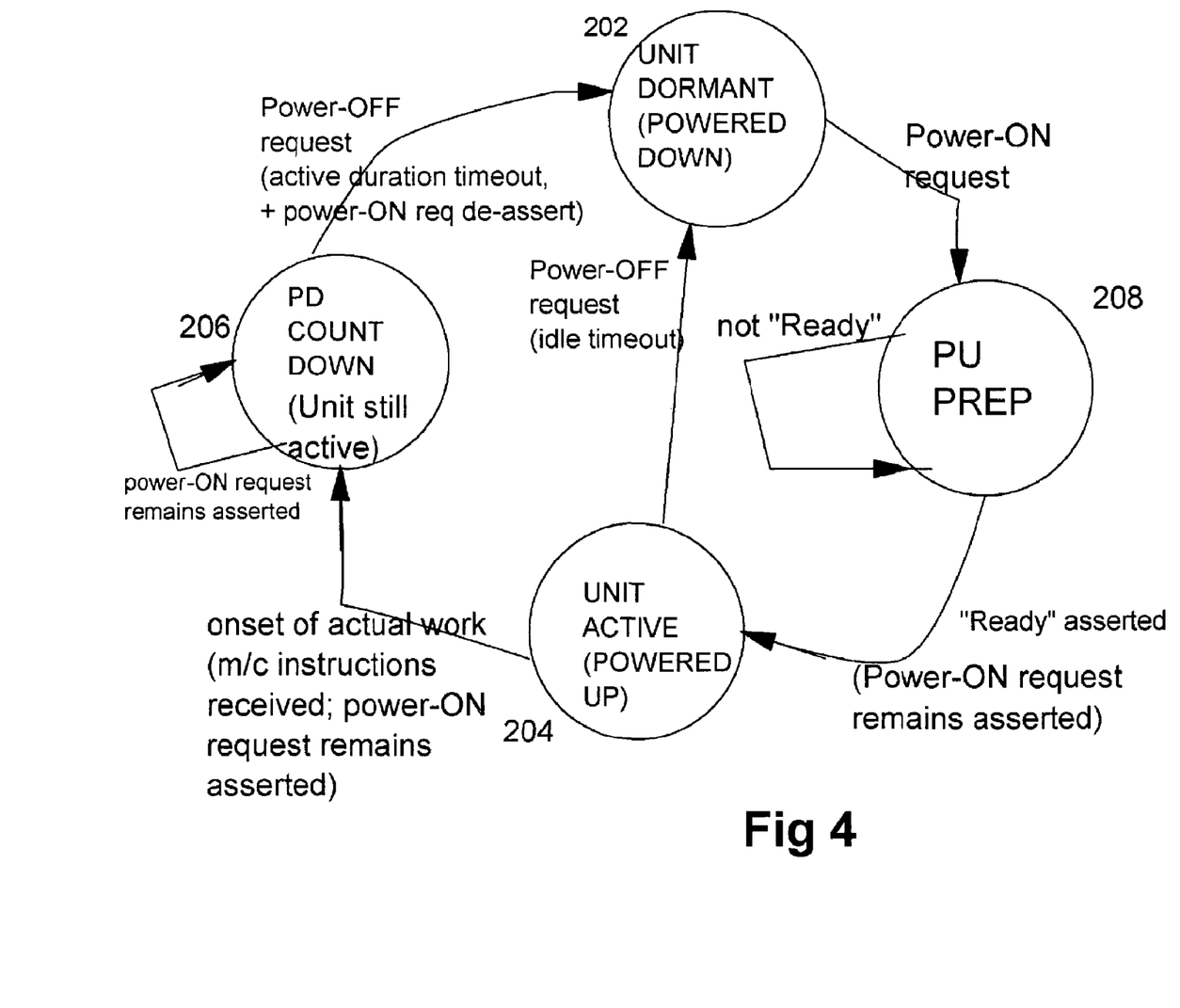
FIG. 4 shows a state diagram for selectively powering up/down a unit in a preferred embodiment processor.

FIG. 4 shows a state diagram 200 for powering up/down preferred embodiment processor units, e.g., by unit-level activity prediction logic 130, using a Vdd-gating mechanism for a given unit in the example of FIG. 2. This is for example only and suitable changes and adjustments may well be made for individual control mechanisms, depending on the power-performance tradeoffs desired for a given gatable unit.

Initially, or by default, each unit may be dormant, in its powered down or dormant state 202 or, active in its fully powered up or active state 204. For simplicity of discussion, the default or initial state of any given unit is the powered down (dormant) state 202; and, each such unit is woken up only on-demand through long- or short-term, proactive prediction, as described hereinabove. When an active period indication is received that a unit will be needed, the unit enters a power up preparation state 208. Such an indication is inferred when there is a power-up "REQUEST" signal 134 asserted for that unit by the GRCU (150 in FIG. 2). After a delay the unit transitions from the power up preparation state 208 to the unit active (powered up) state 204. The delay depends on the duration of its last idle (dormant) period, as further described hereinbelow.

Once powered up in active state 204, the active unit operates normally and also, resets and starts up an idle duration counter. The idle duration counter continues to count unit until it either times out or, the unit receives machine instructions for processing. If the duration times out because the count exceeds a preset threshold, the unit generates an overriding, immediate power-down request that causes the unit to transition back directly to dormant state 202 and, reset and stop the active duration counter. This is essentially a case where the machine encountered a mispredicted (premature) power-ON request, resulting in some leakage power waste. In transitioning back to state 202, the UHT entry that resulted in a misprediction is updated, by increasing the relevant "count down prediction" value, e.g., to twice the current value, by right-shifting in a "1." If the unit receives machine instructions the unit resets and stops the idle duration counter, resets and starts the unit's active duration counter and transitions to power-down countdown state 206.

On generation of a power-OFF request from the active duration counter meeting or exceeding the UHT-predicted duration (with power-ON request deasserted, due to cessation of active instructions), the unit transitions from the power-down countdown state 206 to the unit dormant state 202. The active duration counter continues counting upwards, as long the unit continues to receive valid machine instructions it remains in state 206. It should be noted that the power-ON request remains asserted for the unit, for a small cycle window (e.g. 10 cycles) after the last instruction is received. Therefore, the power-ON request is de-asserted only after the unit stops receiving instructions for 10 consecutive cycles. If the unit begins to receive valid instructions again, while the active duration count is still less than the UHT-predicted duration count, power-ON request is re-asserted, while the unit holds in state 206. Thus, it is possible for the active duration count to keep counting beyond the UHT-predicted duration count. When the unit finally returns to dormant state 202 from state 206, the UHT entry is updated to reflect the current contents of the active duration counter and, the active duration counter is reset and stopped.

Figure 5A:
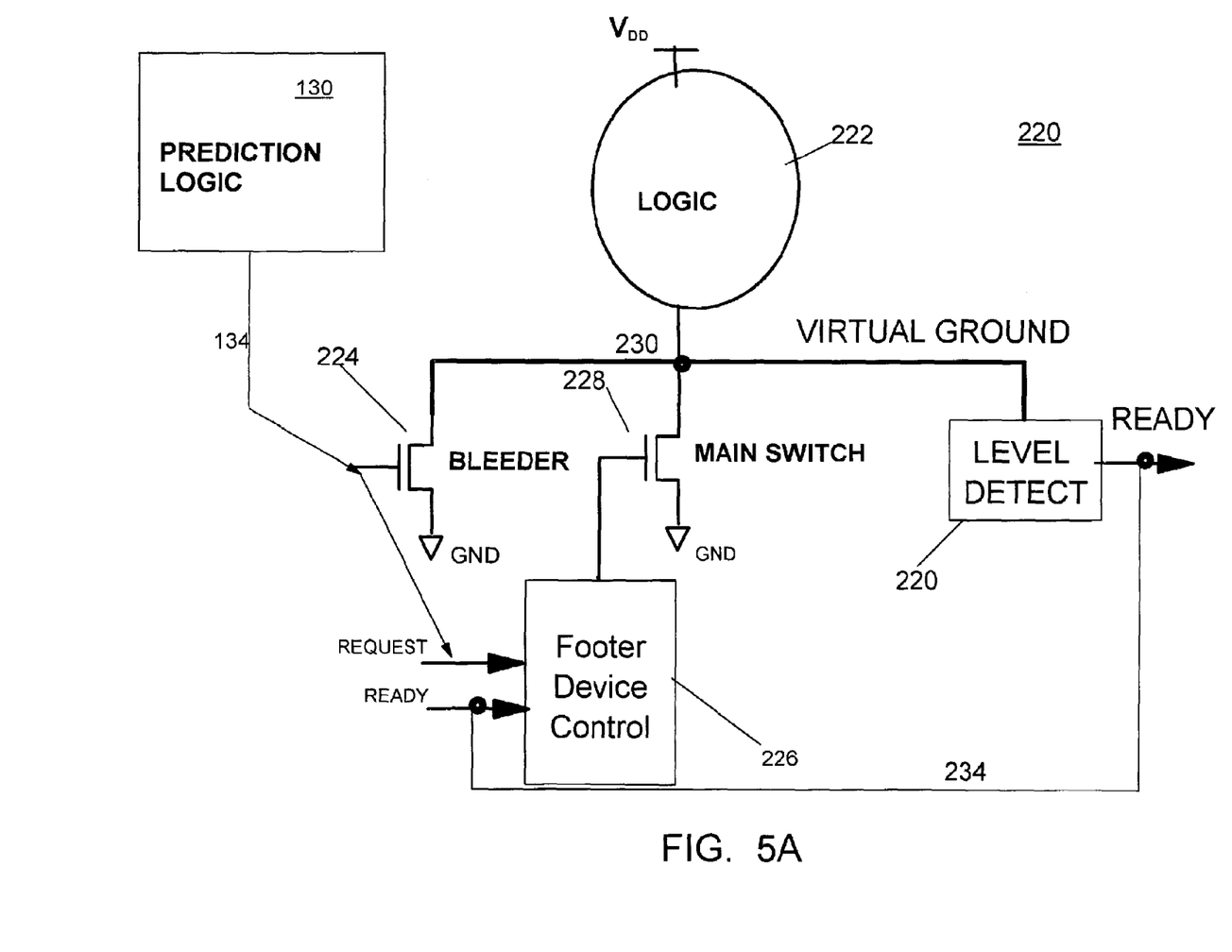
FIGS. 5A–B shows an example of a processor cross section with application of supply voltage switching to logic in response to wake up/sleep requests from unit-level activity prediction logic according to a preferred embodiment of the present invention.

FIG. 5A shows an example of a processor cross section 220 (e.g., of processor 100 of FIG. 1) showing application of supply voltage switching (ground switching in this example) to logic 222 in response to wake up/sleep requests 134 from unit-level activity prediction logic 130 according to a preferred embodiment of the present invention. In this example, each request 134 carries information initiating both immediate or short term power up requests and long term requests. Again, it should be noted that with respect to cross section 220 the predictive logic 130 may be just a contemporaneous selection if so desired, e.g., to fit within design space constraints. The wake up/sleep request 134 is provided to the gate of a bleeder device 224 and a footer device control circuit 226, e.g., a simple AND gate. The output of footer device control 226 is provided to the gate of a main supply switch FET 228, which is dot OR'ed with bleeder device 224, providing a virtual ground 230 to logic 222. Main supply switch FET 228 has a channel width to length ratio (W/L) such that the main supply switch FET 228 is capable of passing at least 10% more current than bleeder device 224 and, preferably, orders of magnitude more, e.g., 1000 times. A level detector circuit 232, which is essentially an (inverting) inverter delay, senses the level on the virtual ground and provides a READY signal 234 input to footer device control 226.

During normal, sustained powered on operation, when the logic 222 is active, the power-on request signal 134 remains asserted, after being proactively set by the prediction logic 130. So, the bleeder device 224 gate is high and virtual ground 230 is low. READY 234 is high and ANDed with the power-on request signal 134. So, the output of footer device control 226 is high, i.e., the main switch 228 is closed. Both the bleeder 224 and the main switch 228 are on, clamping virtual ground 230 to ground. When the unit-level activity prediction logic 130 determines that no activity is likely to occur in logic 222 for the next m cycles (where, e.g., m>100 cycles), the request 134 is deasserted and bleeder 224 turns off. Footer device control 226 drops its output, opening the main switch 228 and floating virtual ground 230. After sufficient subthreshold leakage pulls virtual ground 230 above the input switching point of level detector 220, READY 234 falls.

Later, when the unit-level activity prediction logic 130 determines that activity is expected to occur in logic 222 within the next k cycles, the request 134 is asserted again. The request 134 for use may be based on a measure of the number of instructions or the number of cycles before a first resource instruction that requires the controlled circuit, 130 in this example. Further, the request 134 may be instituted from a compiler instruction, an instruction decode indication that a resource instruction will enter a queue for subsequent dispatch to make functional use of the controlled circuit, or from look ahead logic in an instruction buffer that detects a resource instruction that requires the controlled circuit.

The request 134 for use turns on bleeder 224 but, because READY 234 is low in this example, the footer device control 226 holds the main switch 228 off. Virtual ground 230 discharges slowly through bleeder 224, slowly turning on the logic 222 to minimize large current spikes (dt/dt) that would otherwise occur. When the virtual ground 230 reaches the switching point of the level detector 220 the switch begins to propagate through the level detector 220. After some delay, level detector 220 drives READY 234 high, again ANDing READY 234 with the power-on request signal 134. In response, footer device control 226 closes main switch 228. Main switch 228 clamps virtual ground 230 to ground. A short-notice power-on request, e.g. from IDU 114 is handled no differently than a long-term request originating from prediction table UHT 140. If the virtual ground point 230 is already low enough that READY 234 is asserted when a power-on request is asserted, then the bleeder 224 and main switch 228 turn on almost simultaneously. In this case, since the virtual ground 230 voltage level is low enough, the pull-down discharge current flowing from virtual ground 230 to ground (GND) is small. If the READY 234 is de-asserted when a power-on request arrives, normal "bleeding" followed later by assertion of READY 234 (and closing of main switch 228) occurs. As described hereinabove, the logic circuit 222 does not accept new work (machine instructions) before READY is asserted. Hence, on occasion, a short-notice power-on request may incur a performance delay or penalty.

Figure 5B:
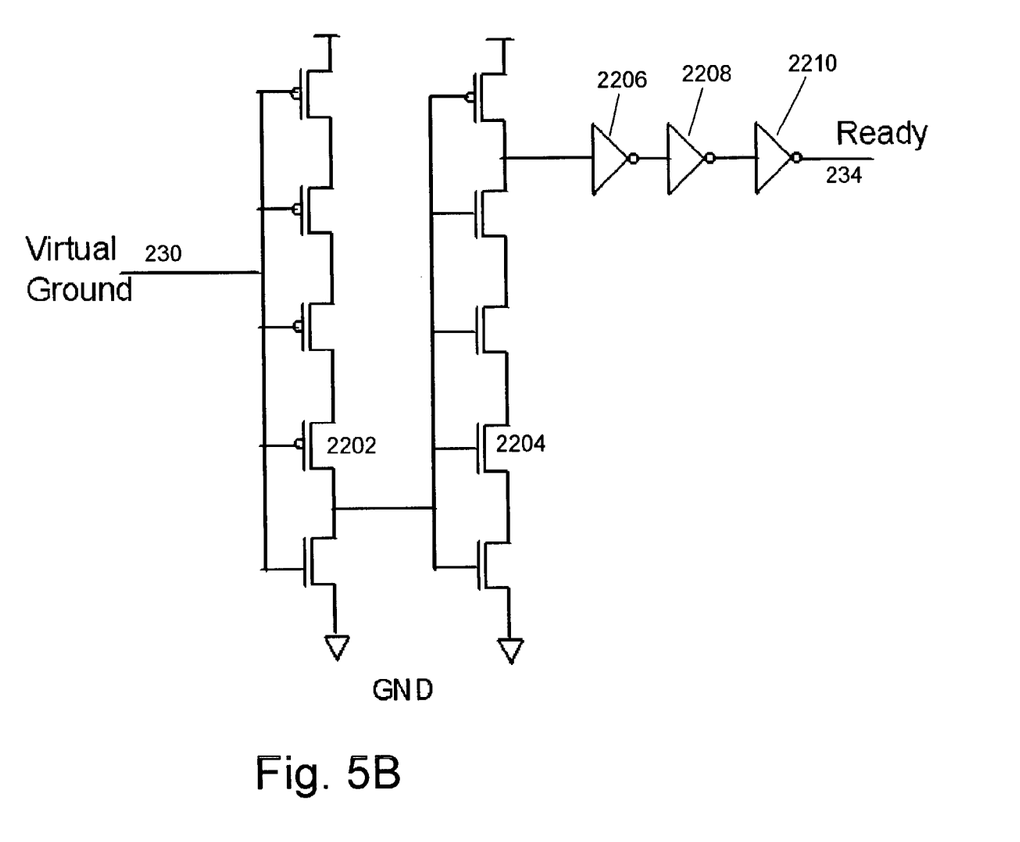

FIG. 5B shows an example of a CMOS level detector circuit 220. In this example, the virtual ground input 230 is passed to a first of two asymmetric inverters 2202, 2204. The output of the first asymmetric inverter 2202 is the input of the second 2204. The output of the second asymmetric inverter 2202 is the input to series connected inverters (3 in this example) 2206, 2208, 210. The output of series connected inverters 2206, 2208, 2210 is READY 234. The asynchronous inverters 2202, 2204 have a normal transient switching response (i.e., to a pulse with a rise and fall time normal for the particular technology, e.g., 100 picosecond (100 ps) rise and fall); that is the output switches faster in one direction than the other. In this example, each of the two asymmetric inverters 2202, 2204 has a series of series connected FETs of a first type and a single FET of a second. In this example, asymmetric inverter 2202 has four P-type FETs (PFETs) between $V_{dd}$ and its output and a single N-type FET (NFET) between the output and ground; asymmetric inverter 2204 has a single PFET between $V_{dd}$ and its output and four NFETs between the output and ground. Thus, the output of the first asymmetric inverter 2202 falls faster than it rises and the second asymmetric inverter 2204 rises faster than it falls. This asymmetry offsets the asymmetry of the virtual ground 230 which is pulled low by the small bleeder device 224 much faster than it rises due to logic subthreshold leakage current. The series connected inverters 2206, 2208, 2210 act to shape the READY output 234, adding very little additional delay.

Figure 6:
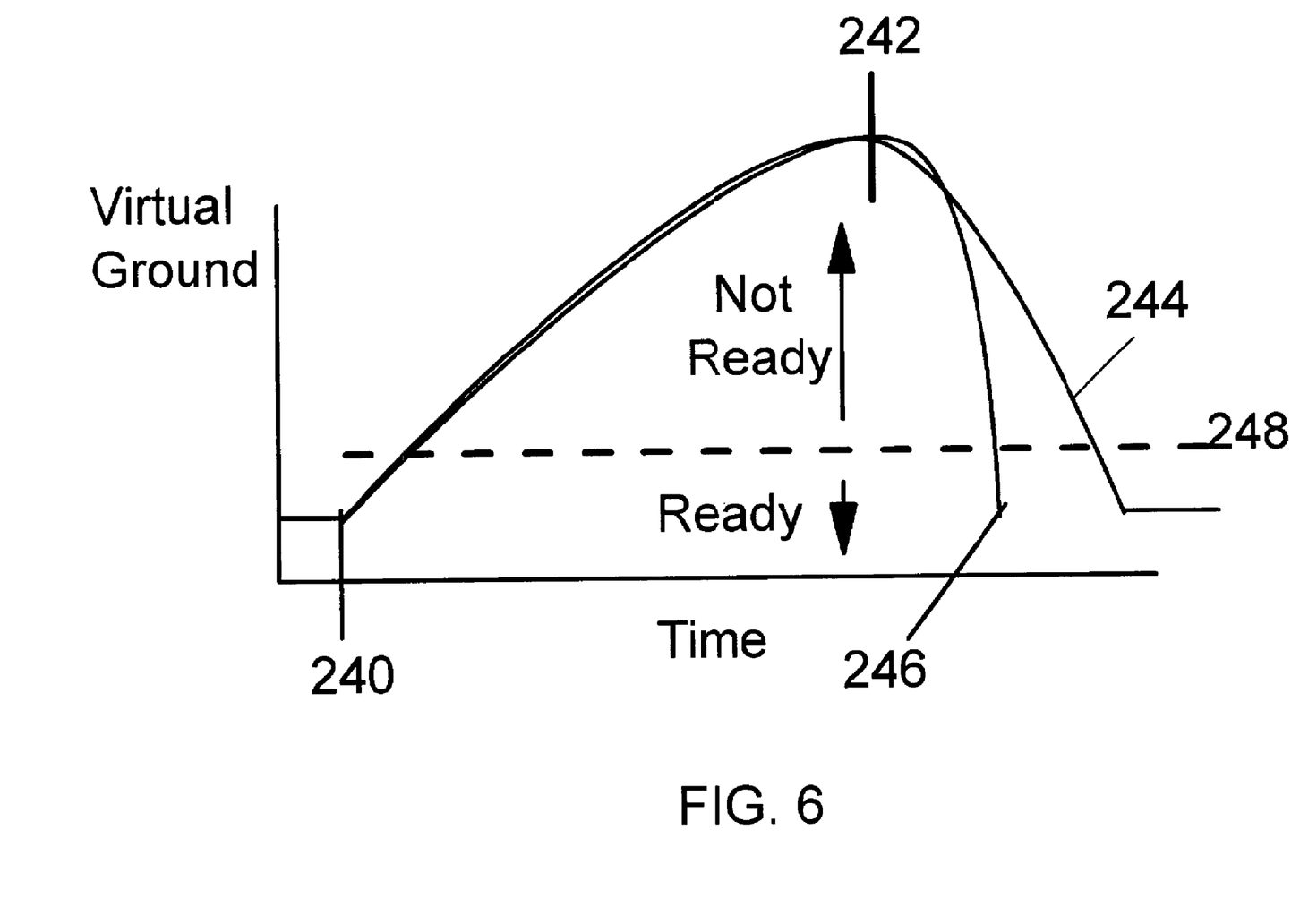
FIG. 6 shows a power up/down voltage response of the supply node of the example of FIG. 5A.

FIG. 6 shows a power up/down voltage response of the supply node (virtual ground 230) of the example of FIG. 5A, wherein a power down request is asserted and begins at 240 and a power up is asserted at 242. So, with reference to FIGS. 5A–B and 6, response curve 244 shows the response to assertion of a LdI/dt control request 134. By comparison, response curve 246 shows the response to assertion of a power-on request (i.e. much sharper discharge rate) that would have been observed without the LdI/dt control mechanism provided by the bleeder switch 224, level detector 220 and the footer device control 226. The primary difference in the two response curves 244, 246 is in the response to the power up assertion at 242, which elicits a much steeper fall in the virtual ground 230 in response 246 to short term requests than to LdI/dt control requests in 244. Dotted line 248 indicates the READY threshold; below 248 the logic is enabled and the level detector 220 drives READY 234 high; and, above 248 ground is not available to the logic 222 and READY 234 is low. The apex of the two curves 244, 246 (essentially at 242 in this example) is identical at the point where leakage ends and the logic is completely off. Further, as the virtual ground rise slope falls off, leakage current is decreasing and leakage power slows/stops, reducing/saving overall leakage power.

When the power off request is received, the main switch 228 opens and the bleeder device 224, if closed, opens also. Virtual ground 230 rises, floating high as indicated on both 240 and 242. Under control conditions (e.g., a predicted idle phase) that allow the footer device control 226 to open the main switch 228, the virtual ground 230 tends to charge up towards the full supply voltage value ($V_{dd}$ in this example). The (static) leakage current to GND in that the unit logic 222 would otherwise exhibit in the absence of supply gating charges the virtual ground capacitance and eventually, leakage halts. Frequently cycling the main switch 228 open and closed (e.g., in response to rapidly alternating "wake-up" and "sleep" requests), reduces the leakage power savings because the virtual ground capacitance only partially charges (i.e., does not reach the apex and, may not reach the reduced slope region) and the controlled logic unit 222 would not remain in its off state long enough. As such, a level detector circuit 220 monitors a suitable electrical parameter characterizing the virtual ground 230 to prevent prematurely closing the main switch 228. Thus, although in this example, level detector circuit 22o monitors virtual ground 230 voltage, other suitable electrical parameters may be monitored such as, current, power or charge.

Power up/down requests may be generated with software (compiler, OS) and architectural support for anticipating gating opportunities tens or hundreds of cycles in advance for specific idle units, e.g., the floating point unit. Preferably, however, a such requests are generated using a combination of such software support with hardware hooks to implement long-range supply gating event prediction. Thus, the specific circuit blocks and units are unambiguously and seamlessly powered up and down without incurring a large performance overhead. Previous gating solutions, whether hardware only or hardware/software combinations, have not employed history-based learning to fine-tune the right prediction window. Thus the present invention provides more effective and efficient supply gating control.

Optionally, additional staggering control can be included to prevent simultaneously turning on several units which could cause large current surges. This optional staggering control ensures units turn on with an acceptable staggering of multiple units to spread turn on currents over an acceptable period and maintain peak current at an acceptable limit. For example, the long range countdown values for multiple units can be adjusted to effect such time staggering.

The present invention, provides broad coverage for both long-range and short-notice prediction/request support and attendant decision logic, ensuring minimum LdI/dt noise turning on units, and power-saving through predictive turning OFF. In particular instantiations within a given design one or more of these general features may be omitted to save area or complexity at the cost of effecting less power saving or incurring more performance penalties.

Advantageously, the present invention provides a history-based predictive method of supply gating tens, hundreds or perhaps even thousands of cycles in advance of the particular event. Further, the present invention has application at any selected level, e.g., unit or pipeline stage level. Further, such long-range prediction enables the attendant control hardware to stage the onset of the gating event in well-defined steps that ensure smooth hardware gating, minimizing LdI/dt effects. Normal architectural performance penalties (cycles-per-instruction or CPI increase) associated with leakage reduction are avoided.

While the invention has been described in terms of several (example) preferred embodiments, those skilled in the art will recognize that the invention can be practiced with modification within the spirit and scope of the appended claims.

We claim:

1. An integrated circuit (IC) including unit power control, said IC comprising:
   a plurality of functional units, ones of said functional units having a supply line;
   a prediction unit determining next expected operations for each of said ones and predicting turn on and turn off times for each determined said next expected operation; and,
   a supply voltage select circuit at each said supply line, each said supply voltage select circuit selectively ramping closed a connection between a supply voltage and a corresponding said supply line responsive to a predicted turn on time and selectively ramping open said connection responsive to a predicted turn off time;
   wherein the supply voltage select circuit comprises:
   a selectable bleeder current path between a corresponding said supply line and said supply voltage, said selectable bleeder current path selectively providing a current path to said corresponding supply line;
   a discharge detector monitoring said corresponding supply line and providing a ready signal when said corresponding supply line is at a selected threshold level; and
   a supply switch selectively clamping said corresponding supply line to said supply voltage.

2. An IC as in claim 1, where said functional units include a logic circuit, a memory circuit and a staging latch circuit.

3. An IC as in claim 1, wherein said selectable bleeder current pat selectively charges said corresponding supply line and said discharge detector monitors supply line charge.

4. An IC as in claim 1, wherein said selectable bleeder current pat selectively discharges said corresponding supply line and said discharge detector monitors supply line discharge.

5. An IC as in claim 4, where said discharge detector monitors a discharge parameter selected from the group comprising voltage, charge, discharge current and discharge power.

6. An IC as in claim 1, wherein said supply switch is closed clamping said corresponding supply line to ground when said discharge detector detects supply line voltage discharging below a threshold voltage.

7. An IC as in claim 1, wherein said prediction unit selectively closes said supply switch clamping said corresponding supply line to ground.

8. An IC as in claim 1, wherein said supply switch is capable of carrying at least 10% more current than current in said bleeder current path.

9. An IC as in claim 8, wherein said supply switch is capable of carrying 1000times the current in said bleeder current path.

10. An IC as in claim 1, wherein at said predicted turn off time said supply switch and said selectable bleeder current path are opened floating said corresponding supply line.

11. An IC as in claim 1, wherein said prediction unit provides a power on request in advance of said predicted turn on time.

12. An IC as in claim 11, wherein said prediction unit provides said power on request responsive to a number of instructions before a predicted fast resource instruction requiring a corresponding functional unit, said number being large enough to reduce supply dI/dt.

13. An IC as in claim 11, wherein said prediction unit provides said power on request responsive to a number of cycles before a predicted first resource instruction requiring a corresponding functional unit, said number being large enough to reduce supply dI/dt.

14. An IC as in claim 1, further comprising an instruction buffer including look ahead logic detecting resource instructions designated for said ones, said prediction unit providing each said power on request responsive to a detected one of said instructions.

15. An IC as in claim 1, further comprising an instruction decode indicating resource instructions designated for said ones, said prediction unit providing each said power on request responsive to a decoded instruction.

16. An IC as in claim 1, wherein said prediction unit provides each said power on request responsive to compiled instruction.

17. An IC as in claim 1, wherein said prediction unit comprises:
   a Usage History Table (UHT);
   a usage prediction counter; and
   a utilization vector (UV) unit, said UHT being indexed by a concatenation of sub-vectors from said UV unit and said usage prediction counter.

18. An IC as in claim 1, wherein the prediction unit provides a power on request responsive to a predicted event selected from the group comprising:
- a requested use of a corresponding functional unit;
- a predicted use of said corresponding functional unit;
- an unconditional turn on signal; and
- an interrupt signal.

19. A leakage reduction circuit for controllably reducing leakage power in an integrated circuit (IC), said leakage control circuit comprising:
- a selectable bleeder switch between a circuit supply line and a supply voltage, said selectable bleeder switch selectively providing a current path to said circuit supply line responsive to a request signal;
- a discharge detector monitoring said circuit supply line and providing a ready signal when said circuit supply line is at a selected threshold level; and
- a supply switch selectively clamping said circuit supply line to said supply voltage responsive to said ready signal.

20. A leakage reduction circuit as in claim 19, wherein the discharge detector monitors one or more of the following:
- bleeder switch voltage;
- bleeder switch current;
- bleeder switch power; and
- capacitive charge on said supply line.

21. An activity prediction unit, for proactive, predictively invoking active/dormant unit states, said activity prediction unit comprising:
- an unit utilization vector/instruction fetch address register (UV/IFAR) receiving current-cycle machine state vectors;
- a prediction unit receiving instruction fetch addresses from said UV/IFAR;
- an instruction decode unit (IDU) providing immediate power up requests; and
- a gating request control unit (GRCU) receiving unit utilization vectors from said UV/IFAR, predicted count and count duration from said prediction unit and immediate power up requests from said IDU, said GRCU generating target unit power up and power down requests.

22. An activity prediction unit as in claim 21, wherein said prediction unit includes a utilization history table (UHT) maintaining count and duration for previously executed instructions in each said target unit.

23. An activity prediction unit as in claim 22, wherein said UV/IFAR concatenates unit utilization vectors (UVs) with two or more bits from the instruction fetch address register to provide an index into the UHT for power on requests.

24. An activity prediction unit as in claim 23, wherein said GRCU comprises:
- an encoder combining said UVs with corresponding look up entries from said UHT;
- a count down register receiving a count to a predicted power on from said encoder; and
- a priority multiplexor receiving a count down complete signal from said countdown register and said immediate power up requests from said IDU, said priority multiplexor providing said power up request for a corresponding one of said target units.

25. An activity prediction unit as in claim 23, wherein said GRCU comprises:
- a predicted duration register maintaining an expected duration of a current powered up state from said UHT;
- a duration count register maintaining a current count for said current powered up state;
- a comparator comparing said expected duration with said current count;
- means for updating said expected duration in said UHT; and
- means for providing said power down request for a corresponding one of said target units responsive to said comparator.

26. an activity prediction unit as in claim 25, wherein said means for providing said power down request combines an output of said comparator with a power up request, said power down request being provided only when said power up request is assert.

* * * * *